(12) United States Patent
Newstadt et al.

(10) Patent No.: US 10,204,499 B1
(45) Date of Patent: Feb. 12, 2019

(54) ANOMALY BASED GEOFENCING LEVERAGING LOCATION DURATION

(71) Applicant: SYMANTEC CORPORATION, Mountain View, CA (US)

(72) Inventors: Keith Newstadt, West Newton, MA (US); Lei Gu, Bedford, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 15/274,168

(22) Filed: Sep. 23, 2016

(51) Int. Cl.
*G08B 21/02* (2006.01)

(52) U.S. Cl.
CPC ..... *G08B 21/0261* (2013.01); *G08B 21/0225* (2013.01); *G08B 21/0269* (2013.01); *G08B 21/028* (2013.01); *G08B 21/0283* (2013.01)

(58) Field of Classification Search
CPC ............ G08B 21/0261; G08B 21/0225; G08B 21/0269; G08B 21/028; G08B 21/0283
See application file for complete search history.

(56) References Cited

U.S. PATENT DOCUMENTS

| | | | | |
|---|---|---|---|---|
| 5,470,233 | A * | 11/1995 | Fruchterman | G08G 1/096861 340/4.14 |
| 6,658,004 | B1 | 12/2003 | Kadansky et al. | |
| 6,868,256 | B2 | 3/2005 | Dooley et al. | |
| 8,965,398 | B2 | 2/2015 | Zhu et al. | |
| 9,137,771 | B2 | 9/2015 | Wrappe | |
| 9,257,041 | B2 * | 2/2016 | Scofield | G08G 1/0104 |
| 9,772,190 | B2 * | 9/2017 | Erkkila | G01C 21/005 |
| 9,794,744 | B1 | 10/2017 | Gu et al. | |
| 2003/0137419 | A1 * | 7/2003 | Gehlot | G08B 21/028 340/572.1 |
| 2003/0137424 | A1 * | 7/2003 | Gehlot | G08B 13/1427 340/573.4 |

(Continued)

OTHER PUBLICATIONS

"iBeacon security: understanding the risks", Reality matters: The Estimote Team Blog, Dec. 9, 2014, 7 pages, http://blog.estimote.com/post/104765561910/ibeacon-security-understanding-the-risks. [Retrieved May 11, 2016].

*Primary Examiner* — Nay Tun
(74) *Attorney, Agent, or Firm* — Meyertons Hood Kivlin Kowert and Goetzel PC; Rory D. Rankin

(57) ABSTRACT

A system and method for efficiently establishing patterns of behavior for location-aware monitoring applications. An administrator registers a trackable entity with a tracking service by providing identification of at least the trackable entity, a point of origin and a destination. To identify and select paths between the point of origin and the destination, the tracking service accesses crowdsourced information corresponding to the history of movements of trackable entities between the point of origin and the destination. The tracking service identifies intermediate locales along the selected paths and determines an expected duration of stay for each of the intermediate locales based on the history of movements. As the tracking service monitors the movement of the trackable entity, the tracking service generates alerts responsive to determining the trackable entity stopped at an unallowed intermediate locale or determining a duration of stay at an identified intermediate locale exceeds an expected duration of stay.

15 Claims, 7 Drawing Sheets

(56) References Cited

U.S. PATENT DOCUMENTS

| | | | |
|---|---|---|---|
| 2008/0033633 A1* | 2/2008 | Akiyoshi | G01C 21/343 |
| | | | 701/418 |
| 2008/0094230 A1* | 4/2008 | Mock | G08B 1/08 |
| | | | 340/573.4 |
| 2009/0201149 A1* | 8/2009 | Kaji | G01C 21/20 |
| | | | 340/539.13 |
| 2011/0148633 A1* | 6/2011 | Kohlenberg | G06F 21/30 |
| | | | 340/541 |
| 2012/0123667 A1* | 5/2012 | Gueziec | G08G 1/0112 |
| | | | 701/119 |
| 2013/0332297 A1* | 12/2013 | Forutanpour | G01C 21/3461 |
| | | | 705/26.1 |
| 2014/0171013 A1* | 6/2014 | Varoglu | H04W 4/22 |
| | | | 455/404.2 |
| 2015/0032366 A1* | 1/2015 | Man | H04W 4/046 |
| | | | 701/412 |
| 2015/0079942 A1 | 3/2015 | Kostka et al. | |
| 2015/0133163 A1 | 5/2015 | Kitamura | |
| 2015/0245189 A1* | 8/2015 | Nalluri | G06Q 50/265 |
| | | | 455/404.1 |
| 2015/0262435 A1* | 9/2015 | Delong | G07C 5/0816 |
| | | | 340/439 |
| 2016/0100311 A1 | 4/2016 | Kumar | |
| 2016/0202076 A1* | 7/2016 | Feng | G01C 21/343 |
| | | | 701/408 |
| 2016/0203718 A1* | 7/2016 | Lloreda | E05B 39/005 |
| | | | 701/442 |
| 2016/0223343 A1* | 8/2016 | Averbuch | B60W 50/14 |
| 2017/0177002 A1* | 6/2017 | Ogura | G05D 1/0278 |

* cited by examiner

ANOMALY BASED GEOFENCING LEVERAGING LOCATION DURATION

BACKGROUND OF THE INVENTION

Field of the Invention

This invention relates to the field of tracking entities and, more particularly, to efficiently establishing patterns of behavior for location-aware monitoring applications.

Description of the Related Art

Tracking the movement of people, transportation and delivery vehicles, pets and so forth, provides security as well as allowing expectations to be set for arrivals and departures. In many cases, a trackable device is used for tracking an entity, such as a child, a senior citizen, a pet, an automobile, a delivery truck and so on. Examples of trackable devices includes mobile devices such as smartphones, a laptop, a tablet computer, an automobile global positioning system (GPS) device and a pocket-sized GPS trackable device. An administrator may register with a tracking service and may define one or more permissible areas for a trackable entity. The administrator may be a family member, an automobile owner, a pet owner, a supervisor for a delivery service, a cattle rancher and so forth.

Once registered with the tracking service, the administrator may set up a policy for a given trackable entity. Such a policy may define allowable geographic areas for the trackable entity and an action to take when the trackable entity varies from the allowable areas. For example, the administrator may define one or more geofences as allowable areas. The administrator may also define an action to take if the trackable entity leaves a given geofenced area. Such an action may include generating and sending an alert, locking or erasing a storage device, disabling a motor vehicle, and so on.

While geofences may be useful in detecting whether a tracked entity leaves a geofenced area, they lack what may be considered important information. For example, a geofence may be sufficiently large to include both a point of origin and a destination which would allow a delivery truck to travel between the two locations without triggering alerts. While such an approach may be useful in determining that the truck departs the origin and arrives at the destination, stops at intermediate locations along the way may not be detected. Consequently, the delivery truck may make an unscheduled stop at an out of sight parking lot for possible theft of goods inside the truck or other improper behavior.

In view of the above, improved systems and methods for efficiently establishing patterns of behavior for location-aware monitoring applications are desired.

SUMMARY OF THE INVENTION

Systems and methods for efficiently establishing patterns of behavior for location-aware monitoring applications are contemplated. In various embodiments, an administrator registers a trackable entity with a tracking service, which is a location-aware monitoring software application run on a server or other computing device. The trackable entity may be a child, a senior citizen, a pet, a herd of cattle, an automobile, and a delivery truck and so on. A trackable device may be used to monitor the movements of the trackable entity.

Each example of the trackable device may include the capability to report location-aware information such as geographical location information. For example, the trackable device may include capability to communicate with one or more satellites to receive global positioning system (GPS) coordinates. Examples of the trackable device may include a smartphone, a laptop, a tablet computer, a device to connect within an automobile or truck, a pocket-sized device to connect to a backpack or drop into the backpack, and so forth. The trackable device may use additional methods for obtaining location-aware information such as at least cellular network towers and beacon devices. The trackable device may include the capability to communicate with a server executing the tracking service. For example, in some embodiments, the trackable device may use the Internet to communicate with the tracking service.

In various embodiments, to register the trackable entity with the tracking service, the administrator provides identification of the trackable entity, a point of origin and a destination. In various embodiments, the administrator provides no further information to setup a tracking policy to provide security and identify expected arrival and departure times despite a relatively large number of possible combinations of routes and stops (or intermediate locales) along the routes. In place of the administrator entering further information, the tracking service may access crowdsourced information stored in a database to identify paths between the point of origin and the destination. For example, the database may store information about the movement of trackable entities between the point of origin and the destination. The information may have been obtained from mobile devices collecting and reporting movements of users. The mobile devices may include smartphones, smartwatches and so forth. The movement information may have been additionally obtained from security cameras. The information may have also been obtained from responses to surveys regarding routes taken between points of interest. A variety of different methods may have been used to obtain the crowdsourced information.

By accessing the crowdsourced information, the tracking service running on the server may identify one or more paths between the point of origin and the destination based on a history of movements of trackable entities between the point of origin and the destination. The tracking service may select a subset of paths from the identified paths for later verifying the movement of the trackable entity. In addition, the tracking service may identify intermediate locales (stops) along the subset of paths based on the history of movements. Further, the tracking service may determine an expected duration of stay for each of the intermediate locales based on the history of movements.

Once registered, the trackable entity is monitored by the tracking service with the use of the trackable device. As the tracking service receives information about the movement of the trackable entity, the tracking service may generate an alert. The alert may be generated responsive to determining a movement of the trackable entity varies from the selected paths. For example, the tracking service may determine the trackable entity traveled on a path which is not included among the selected paths. Varying from the selected paths may also include determining the trackable entity has made a stop at an intermediate locale that is not included among the identified intermediate locales. Additionally, varying from the selected paths may include determining a duration of stay at an identified intermediate locale exceeds an expected duration of stay.

These and other embodiments will be appreciated upon reference to the following description and accompanying drawings.

Figure 1:
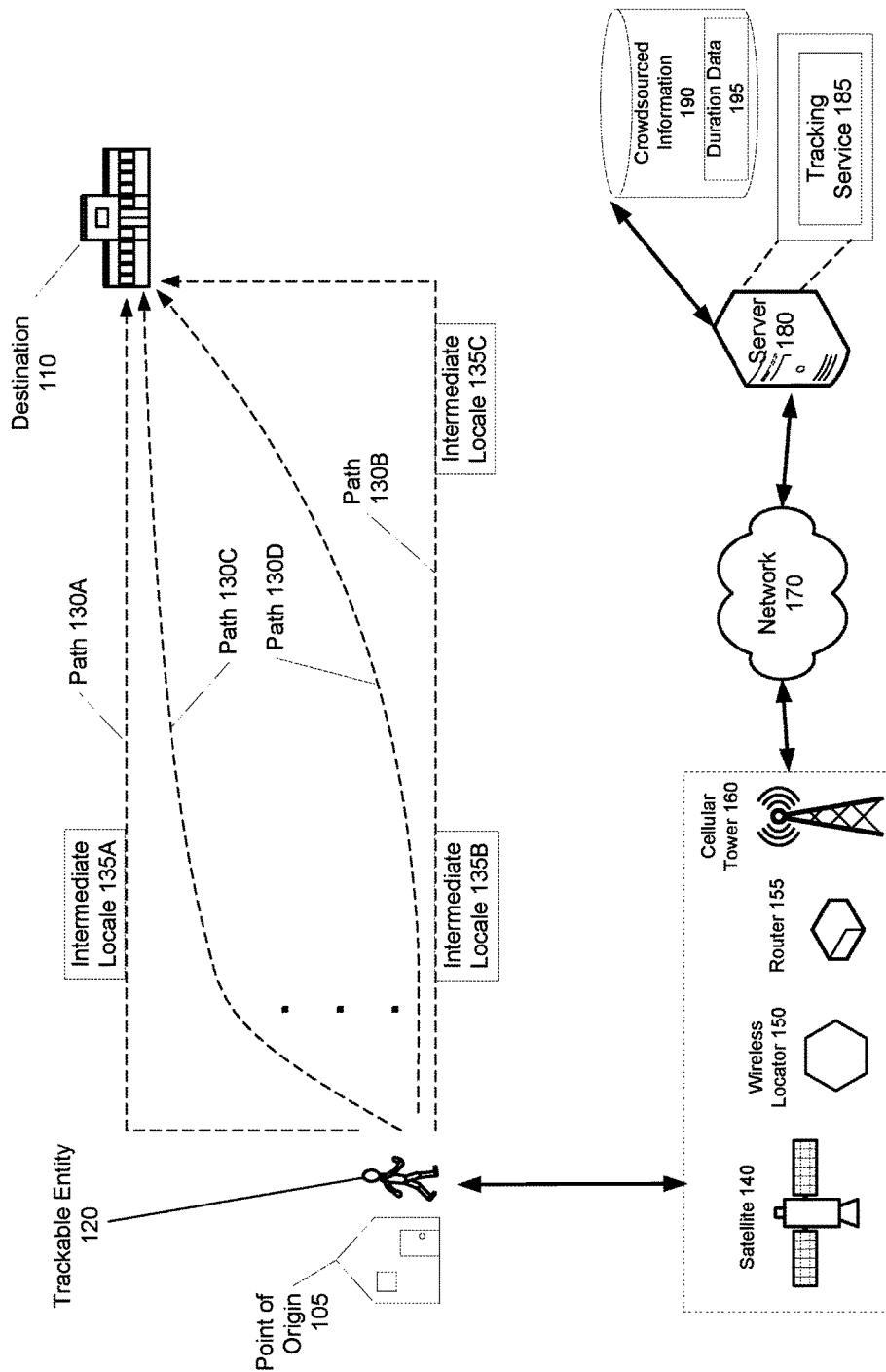
FIG. 1 is a generalized block diagram illustrating one embodiment of tracking movement of a student as a trackable entity between a point of origin and a destination.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Trackable devices are used to monitor the movements of a trackable entity. The tracking service determines whether violations have occurred, and if so, to generate alerts for an administrator. The administrator registers the trackable entity with the tracking service by providing identification of the trackable entity, a point of origin and a destination. The administrator may provide no further information to setup a tracking policy despite a relatively large number of possible combinations of routes and stops (or intermediate locales) along the routes. In place of the administrator entering further information, the tracking service accesses crowd-sourced information, personal history information or both. Using the accessed information, the tracking service identifies paths between the point of origin and the destination, identifies intermediate locales along the paths and determines an expected duration of stay for each of the intermediate locales.

As the tracking service receives information about the movement of the trackable entity, the tracking service generates alerts responsive to determining violations have occurred. One type of violation is the trackable entity stops at a disallowed intermediate locale along a valid path. Another type of violation is the trackable entity remains at a valid intermediate locale for a time which exceeds an expected duration of stay.

Figure 2:
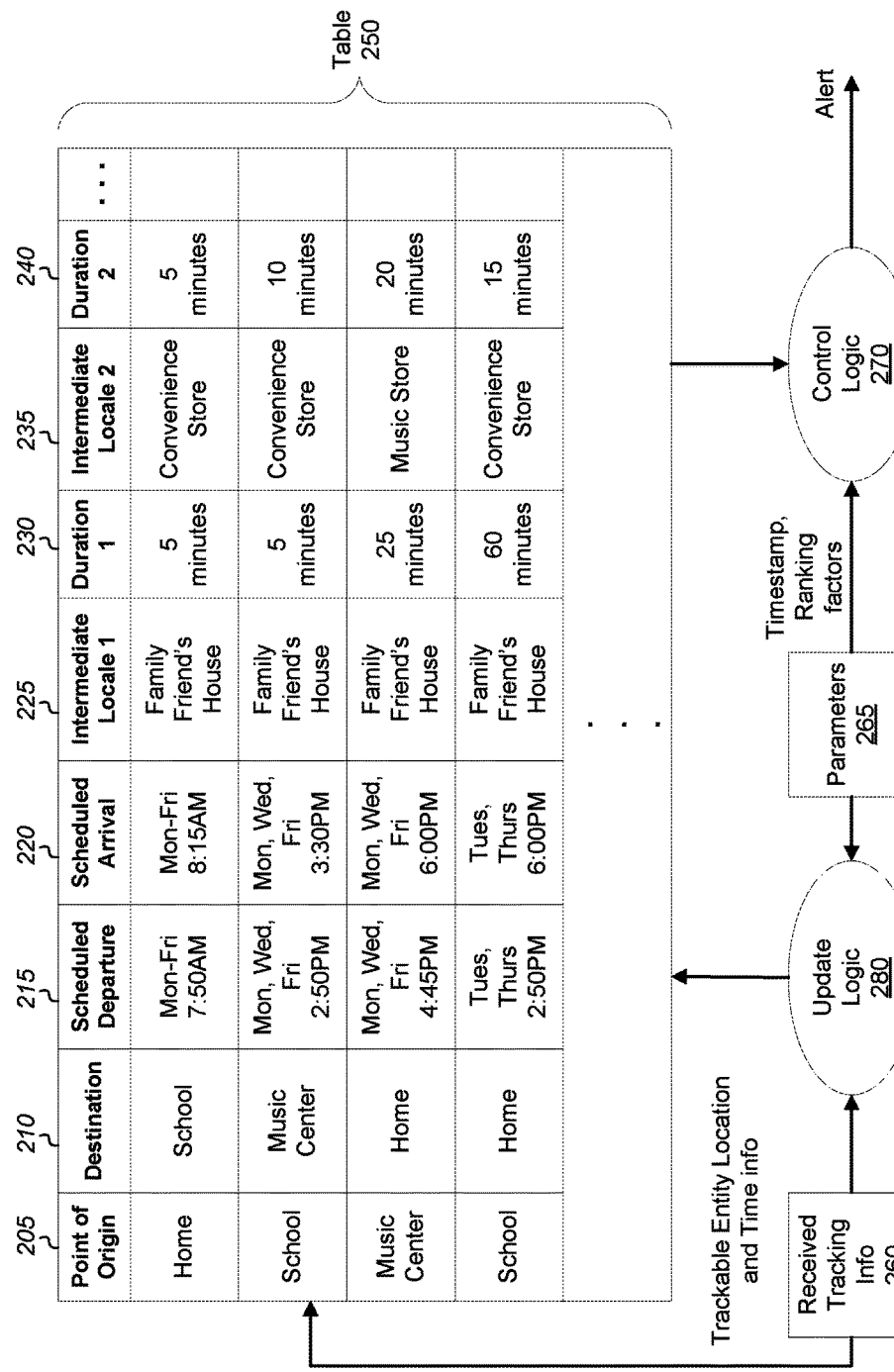
FIG. 2 is a generalized block diagram illustrating one embodiment of logic used for determining whether violations occur during movement of a trackable entity.
Figure 3:
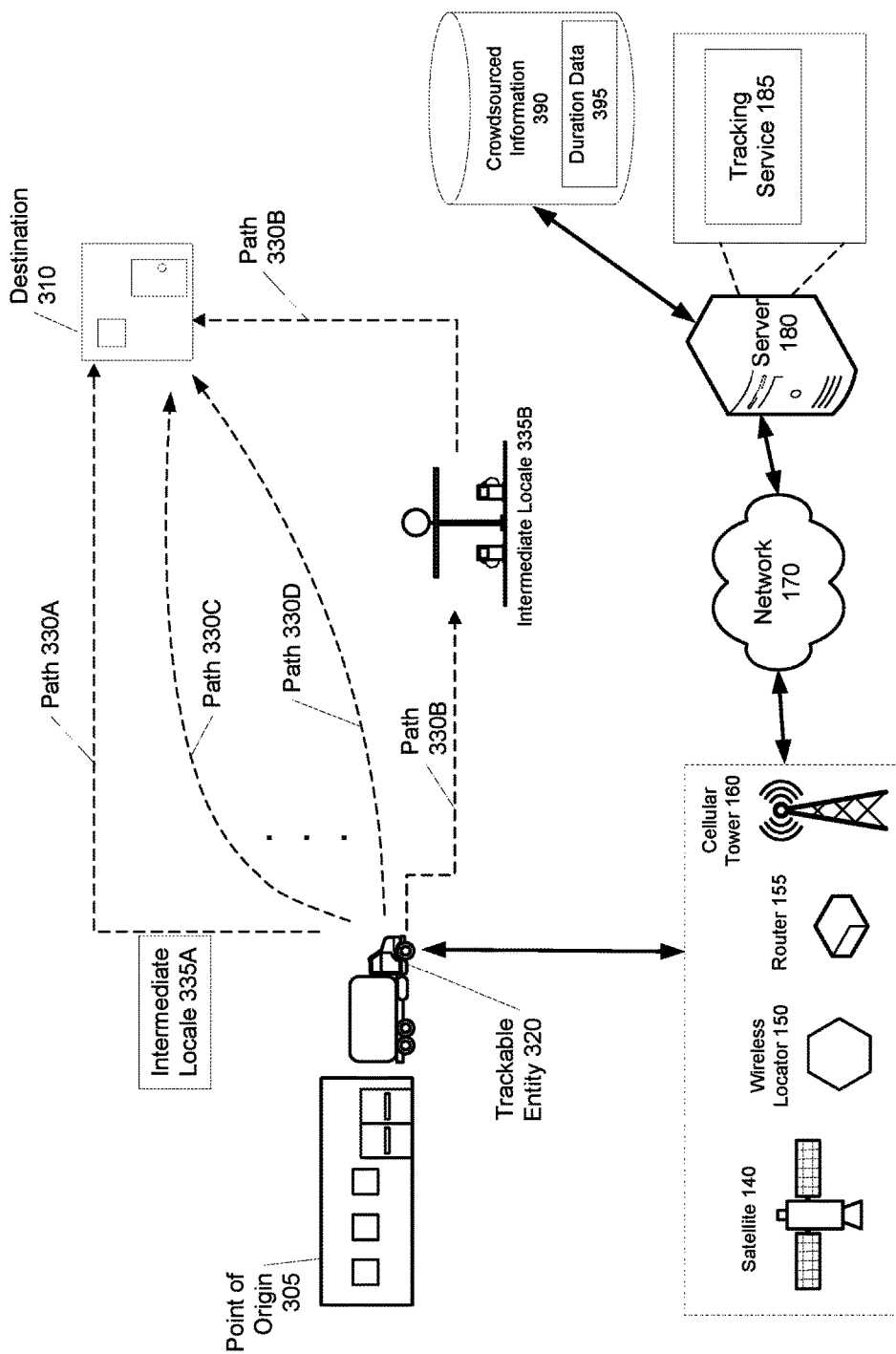
FIG. 3 is a generalized block diagram illustrating one embodiment of tracking movement of a delivery truck as a trackable entity between a point of origin and a destination.
Figure 4:
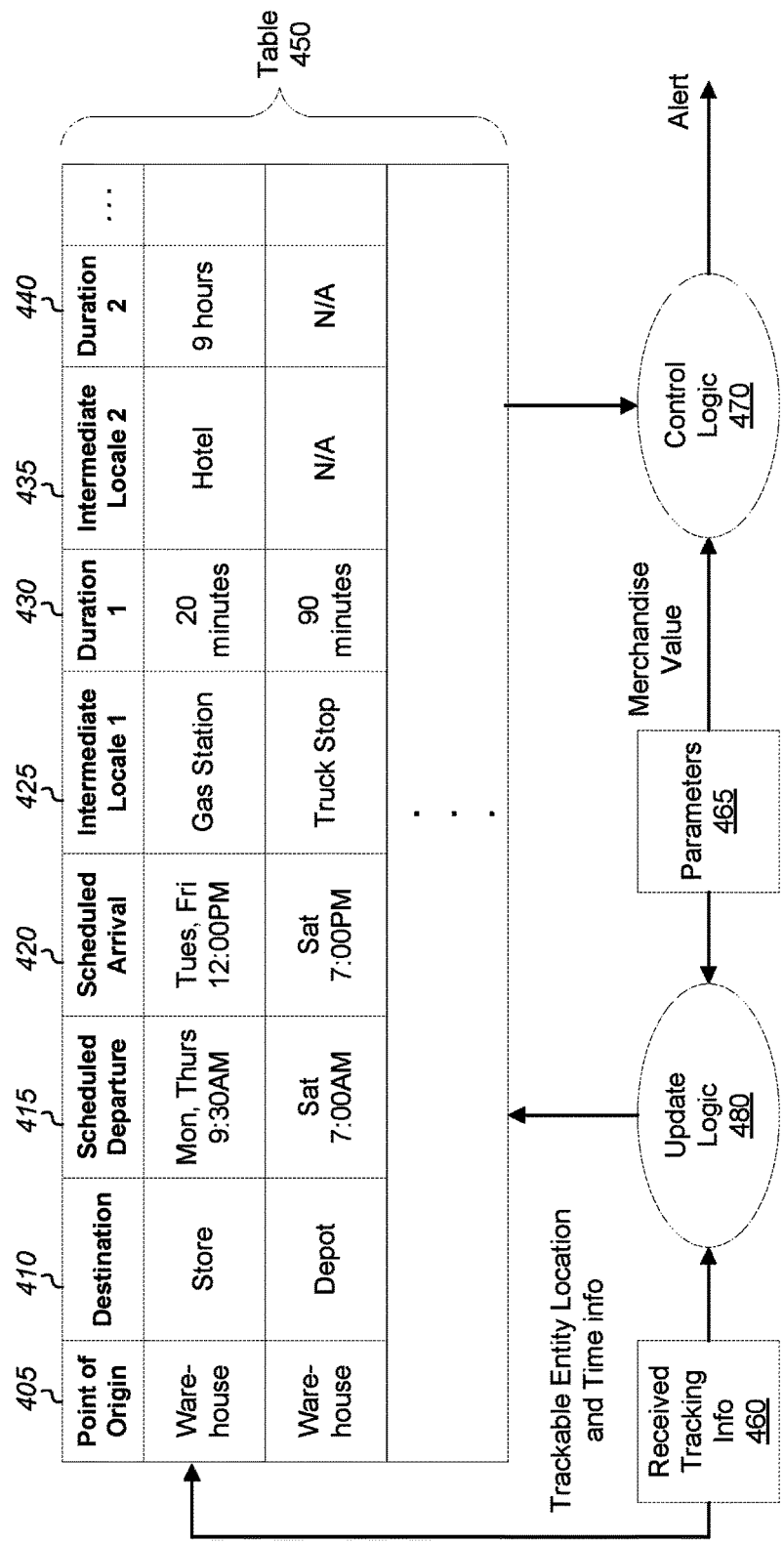
FIG. 4 is a generalized block diagram illustrating another embodiment of logic used for determining whether violations occur during movement of a trackable entity.
Figure 5:
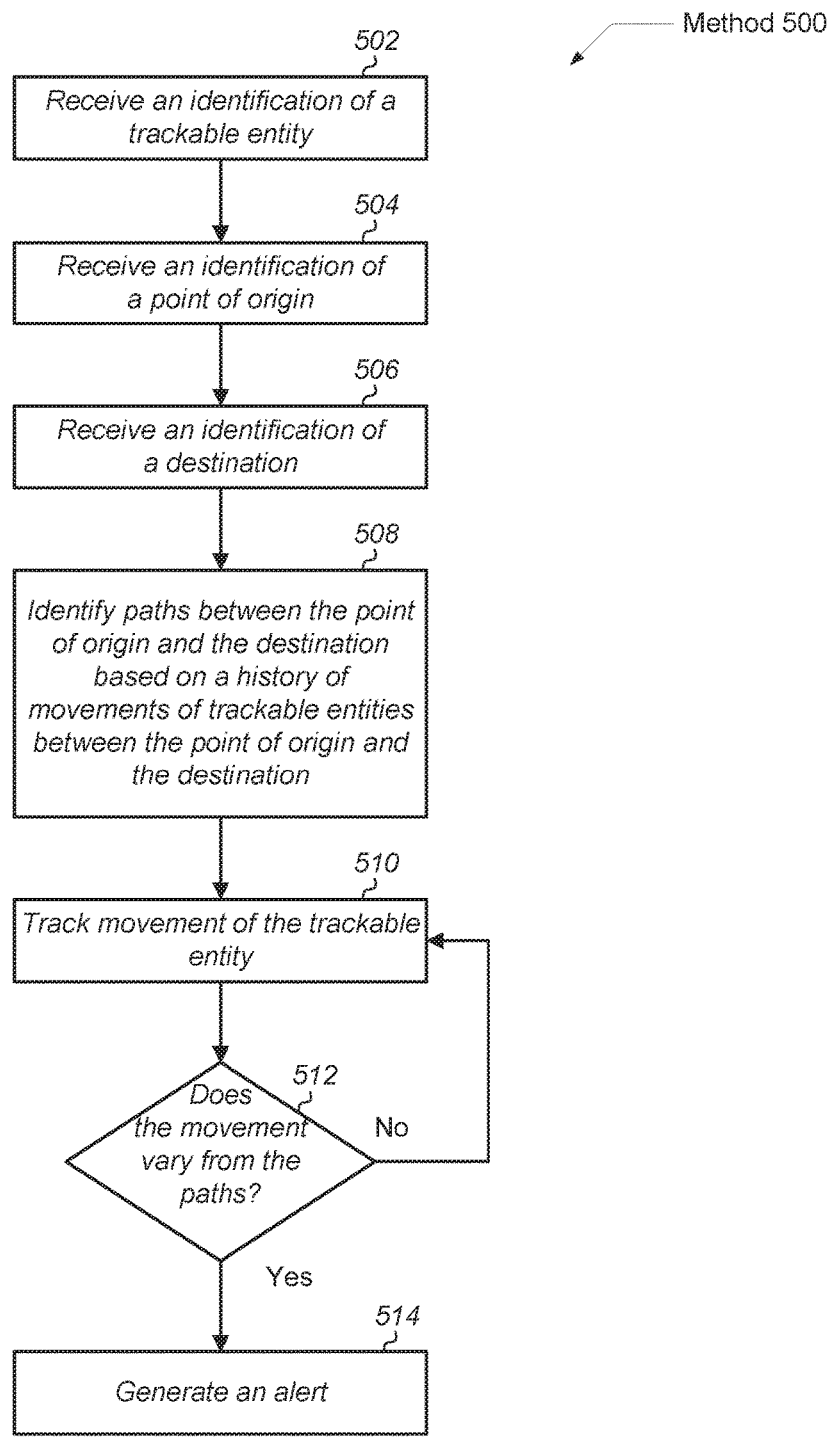
FIG. 5 is a flow diagram illustrating one embodiment of a method for using a history of movements of trackable entities to setup and use a tracking service.
Figure 6:
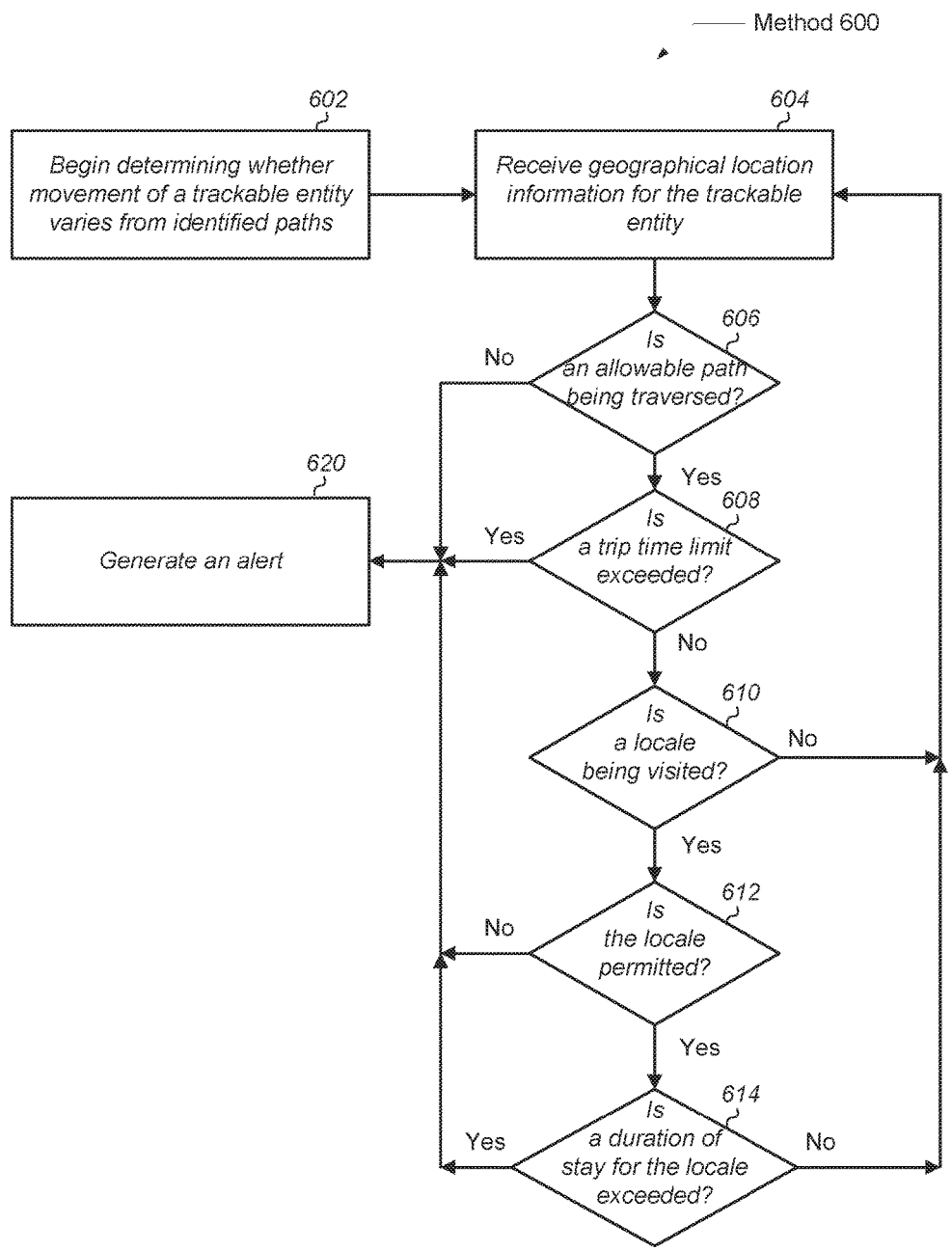
FIG. 6 is a flow diagram illustrating one embodiment of a method for generating alerts responsive to determining violations have occurred during the tracking of movements of a trackable entity.
Figure 7:
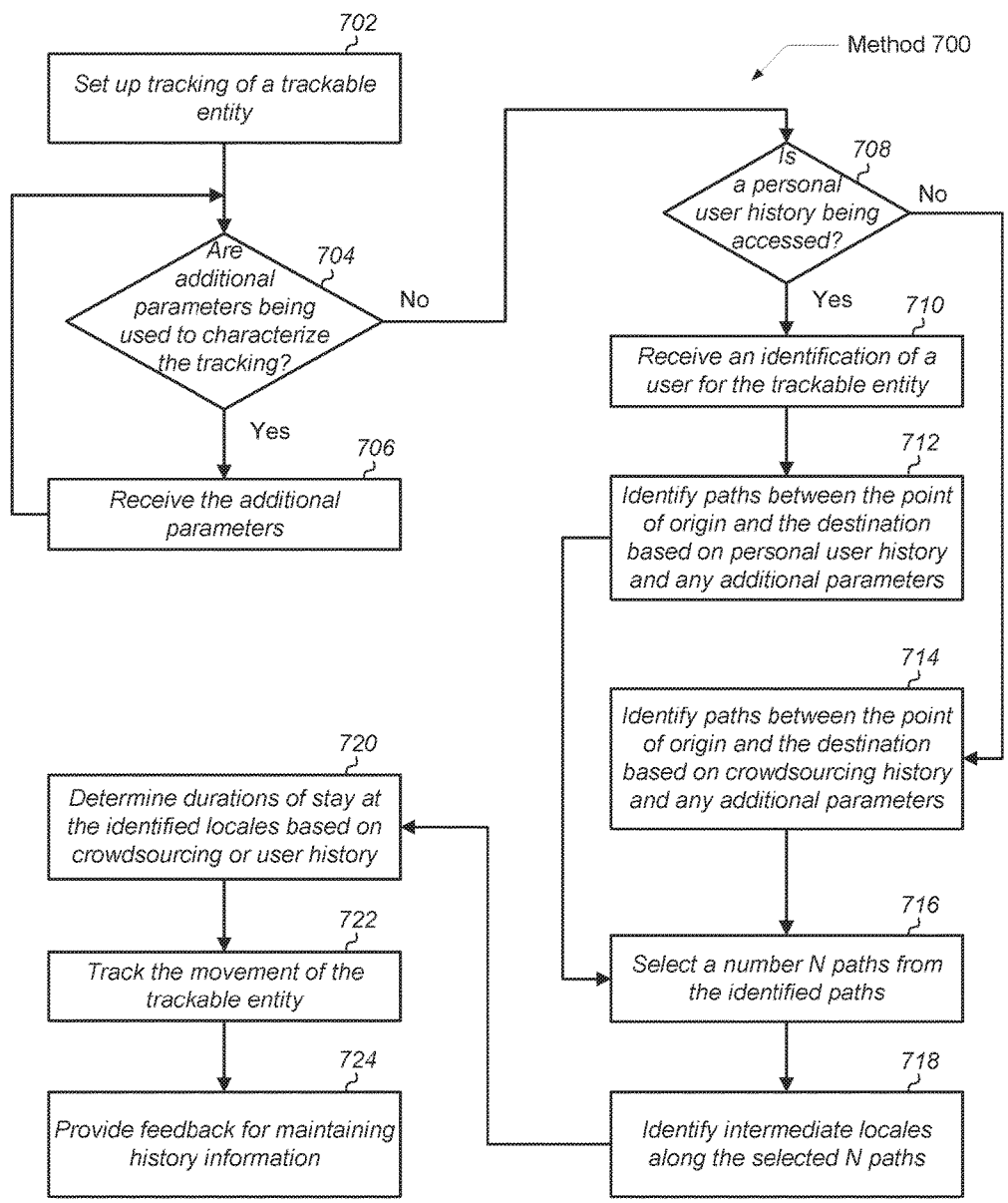
FIG. 7 is a flow diagram illustrating one embodiment of a method for setting up the tracking of the movements of a trackable entity.

In the following discussion, FIG. 1 illustrates an embodiment of tracking movement of a student as a trackable entity between a point of origin and a destination. FIG. 2 illustrates an embodiment of logic used for determining whether violations occur during movement of a trackable entity. FIG. 3 illustrates an embodiment of tracking movement of a delivery truck as a trackable entity between a point of origin and a destination. FIG. 4 illustrates another embodiment of a table used for determining whether violations occur during movement of a trackable entity. FIG. 5 illustrates a method for using a history of movements of trackable entities to setup and use a tracking service. FIG. 6 illustrates a method for generating alerts responsive to determining violations have occurred during the tracking of movements of a trackable entity. FIG. 7 illustrates a method for setting up the tracking of the movements of a trackable entity.

Referring to FIG. 1, a generalized block diagram of one embodiment of tracking movement of a person as a trackable entity between a point of origin and a destination is shown. In the embodiment shown, the trackable entity 120 is a person carrying a trackable device. In some embodiments, the person is a child. In other embodiments, the person is a spouse, a senior citizen, a housekeeper, a visiting friend and so on. In various embodiments, the trackable device is a smartphone, a smartwatch, a pocket-sized GPS trackable device, a tablet computer and so on. An administrator (not shown) sets up an account with the tracking service 185 and identifies the trackable entity 120, a point of origin 105 and a destination 110. To identify the trackable entity 120, the administrator may provide identification of the trackable device. The identification of the trackable device may include a device identifier (ID). It may be assumed the movement of the trackable device correlates with the movement of the trackable entity.

In various embodiments, the point of origin 105 is a home, the destination 110 is a school and the administrator is a parent. Alternatively, the point of origin 105 and the destination 110 may be a variety of other locations of interest, locations routinely visited and so forth. In a later example, a delivery truck is the trackable entity which travels between a point of origin which is a warehouse and a destination which is a store or delivery depot. The administrator may be a company supervisor. In other examples, a herd of cattle is the trackable entity which travels between a point of origin which is a ranch and a destination which is an auction site. The administrator may be a rancher. A variety of other examples are possible and contemplated.

To set up the account, the administrator accesses the tracking service 185 through a mobile application or an internet web browser application running on a local computing device. Once an account is setup, the administrator can login to the server 180, which executes the tracking service 185, and provide the identification of the trackable entity 120, the point of origin 105 and the destination 110. The administrator may perform the login and the setup from a variety of local computing devices (not shown), such as a desktop computer, a laptop computer, a smartphone and so forth.

A variety of means for identifying the point of origin 105 and the destination 110 may be used. For example, the administrator may create a geofence (geo-fence) around the point of origin 105 and another geofence around the destination 110. The geofence is a virtual perimeter for a real-world geographic area. The administrator can draw a geofence onscreen around a photo or other picture depicting the point of origin 105 and the destination 110. Alternatively, the administrator can type or select from a menu predefined geofences such as school zones, neighborhood boundaries, a street address and a radius and so forth.

In various embodiments, upon identifying the trackable entity 120, the point of origin 105 and the destination 110, the administrator provides no further information to set up a tracking policy for monitoring the movement of the trackable entity 120. The tracking policy enforced by the tracking service 185 may be used to provide security and identify expected arrival and departure times. The administrator may provide no further information to set up the tracking policy despite a relatively large number of possible combinations of paths and stops (or intermediate locales) along the paths between the point of origin 105 and the destination 110. In the embodiment shown, four paths 130A-130D are identified between the point of origin 105 and the destination 110. However, any number of paths may exist and be identified between the point of origin 105 and the destination 110.

In place of the administrator entering further information than the above identification, the tracking service 185 may access crowdsourced information 190 stored in a database to identify paths 130A-130D between the point of origin 105 and the destination 110. The administrator may not identify any paths let alone paths 130A-130D. The crowdsourced information 190 stores history information about the movement of trackable entities between the point of origin 105 and the destination 110. In some embodiments, the crowdsourced information 190 has been obtained from mobile devices collecting and reporting movements of trackable entities. The history information may have been additionally obtained from security cameras set up in stores, office buildings, on street corners, at the entrances and exits of places of business, at particular intersections or at overpasses on highways and so forth. The history information may have also been obtained from responses to surveys regarding paths taken between points of interest. A variety of different methods may have been used to obtain the crowdsourced information 190.

By accessing the crowdsourced information 190, the tracking service 185 executing on the server 180 identifies multiple paths based on the history of movements of trackable entities between the point of origin 105 and the destination 110. The tracking service 185 may identify dozens, hundreds or even thousands of paths between the point of origin 105 and the destination 110 as many separate paths and many combinations of routes may exist and have been chosen by trackable entities between the point of origin 105 and the destination 110. The tracking service 185 may select a subset of paths, such as paths 130A-130D, from the identified multiple paths for later verifying the movement of the trackable entity 120.

Ranking the identified multiple paths and selecting the subset of paths 130A-130D may be based on a variety of factors. Generally speaking, some factors may include an overall distance of the paths, an estimated travel time for the paths, a number of turns in the paths, a number of different streets, a cost of highway tolls, and an increase in altitude along a path and so on. In addition, the tracking service 185 may dynamically select the paths 130A-130D based on relatively recent traffic reports, weather reports and so on.

Both static and dynamic selection of the paths 130A-130D may also be done based on identification of the trackable entity 120. The tracking service 185 may include an algorithm for ranking and selecting paths to provide a least amount of effort for traversal of the paths for the trackable entity 120. The algorithm of the tracking service 185 may alternatively provide a maximum amount of effort for traversal of the paths for the trackable entity 120 if an exercise workout is frequently associated with the trackable entity 120. For example, paths with hills and stairs may be selected over more direct paths.

The tracking service 185 may also prioritize paths with scenic outlooks, paths with a high amount of crowds, paths with seclusion, and paths with handicap access capabilities and so on. The tracking service 185 may access another database (not shown) with route information to map the identified multiple paths with actual streets, highways, sidewalks and so on. In various embodiments, the tracking service 185 performs this mapping step prior to selecting the subset of paths 130A-130D as the routes may be used in the selection algorithm. Therefore, in various embodiments, the tracking service 185 identifies paths based on documented behavior of the trackable entities and afterward maps the paths to roads and other means of transit.

The tracking service 185 identifies intermediate locales (stops) along the subset of paths based on the history of movements. As shown, the tracking service 185 identified the intermediate locale 135A along path 130A. In addition, the tracking service 185 identified intermediate locales 135B-135C along path 130B. Although not shown, one or more intermediate locales may exist along paths 130C-130D. For the example shown with the trackable entity being a child, the point of origin 105 being a home and the destination 110 being a school, the intermediate locales 135A-135C may include a variety of places of business along the paths, parks, libraries, community centers and so on. In other examples with a different trackable entity, point of origin and destination, various and numerous examples of the intermediate locales may be found. These other examples may include gas stations and truck stops for a delivery truck as the trackable entity, water holes and grazing areas for a herd of cattle as the trackable entity, and so forth.

The tracking service 185 can access other databases (not shown), such as information about interests and hobbies of the trackable entity 120. The interests and hobbies information stored in other databases may be found from surveys, from public information in social media accounts, from sales of particular products and so forth. In addition to the earlier considerations, the tracking service 185 can select paths 130A-130D based on one or more of at least age, demographics, geographic location, and interests and hobbies.

Further, the tracking service 185 may determine an expected duration of stay for each of the intermediate locales 135A-135C based on the history of movements found in the durations of stay 195 in the crowdsourced information 190. For example, other trackable entities, such as other children of a similar age, may visit a particular convenience store either on the way to school, on the return from school, or both. The convenience store may be intermediate locale 135A along path 130A. An average duration of stay can be 5 minutes. However, the durations of stay 195 may have multiple values based on the time of day. In the mornings, the duration of stay for the intermediate locale 135A (convenience store) can be 5 minutes, but in the afternoon, the duration of stay increases to 20 minutes. The day of the week and the month of the year may also affect the duration of stay.

Similar to the intermediate locale 135A, the intermediate locales 135B-135C along path 130B can be convenience stores, music stores, candy stores, mobile phone and accessories stores, community centers, parks, town landmarks and so forth. Each of the intermediate locales 135B-135C has its own duration of stay which can vary based on a time of day, day of week and month of year. As described earlier, the tracking policy set up by the tracking service 185 can include the above information obtained by accessing at least the crowdsourced information 190, but without further input from the administrator other than identification of the trackable entity 120, the point of origin 105 and the destination 110. Defining conditions for generating alerts by the tracking service 185 may also be done without further input from the administrator. The conditions can include at least the trackable entity 120 exceeding the durations of stay at intermediate locales 135A-135C and the trackable entity 120 visiting unauthorized intermediate locales.

When the tracking policy used by the tracking service 185 is set up, the movement of the trackable entity 120 is monitored by the tracking service 185 with the use of the trackable device. The trackable device can include onboard location-aware subsystems. For example, the trackable device can include a global positioning system (GPS) or radio which receives coordinates from one or more satellites, such as satellite 140. In addition, the trackable device can include a subsystem for wireless access point triangulation.

Further, the trackable device can receive packets broadcast by a transmitting module within a nearby beacon. In various embodiments, each of the beacon and the trackable device uses wireless technology, such as Bluetooth low energy (BLE) technology, to communicate. The beacon may be used to further pinpoint the location of the trackable device. For example, the GPS subsystem may locate the trackable device within an intermediate locale, such as a convenience store or café, but the beacon can provide information to identify the trackable device is at the front of the intermediate locale, the back, at the cash register and so forth.

At a given frequency, the trackable device sends location-aware information to the server 180. The given frequency can be a configurable parameter with a default setting, such as every two minutes. The frequency may change automatically based on the time of day. For example, when the trackable entity 120 is a child walking to school, the frequency may be every minute between a scheduled departure from the point of origin 105 (home) and a scheduled arrival at the destination 110 (school). Similarly, the frequency may be every minute after school hours when the trackable entity 120 (child) travels between the school and home. However, during school hours, the frequency may decrease to every hour or two hours.

As shown, the trackable device communicates with a variety of devices using various technologies. For example, the trackable device communicates with the satellite 140 in addition to a wireless locator 150, such as a beacon. A router 155 may be a Wi-Fi router or node. The cellular tower 160 may be used as part of a cellular provider for the trackable device. For example, the cellular tower 160 may be part of a global system for mobile communications (GSM) cell network providing protocols for digital cellular networks. Alternatively, the cellular tower 160 is part of a code division multiple access (CDMA) cell network also providing protocols for digital cellular networks. The cell network may send data to the server 180. In various embodiments, the cell network encrypts the data prior to sending it to the server 180.

The network 170 may include multiple switches, routers, cables, wireless transmitters and the Internet for transferring messages and data. In some embodiments, the trackable device and its support for various other devices and communication technologies and protocols contribute to the growth of the Internet of Things (IoT), which is a network of physical objects that exchange data via the existing Internet infrastructure. When the server 180 receives information from the trackable device, the tracking service 185 can determine whether any violations occurred during monitoring of the movements of the trackable entity 120. If so, the tracking service 185 can generate alerts. The tracking service 185 can send the alert to one or more devices accessible by the administrator. For example, the tracking service 185 can send a text message to a smartphone or a smartwatch. The tracking service 185 can also send an email and a push notification.

Turning now to FIG. 2, a generalized block diagram of one embodiment of logic used for determining whether violations occur during movement of a trackable entity is shown. The logic may be used by a tracking service. As shown, the received tracking information 260 is used to index the table 250. The received tracking information 260 may include at least identification of a trackable entity, location-aware information, and an indication of an arrival or departure time.

Each entry of the table 250 may store information within multiple fields. For example, the field 205 stores an indication of a point of origin, the field 210 stores an indication of a destination, and the fields 215 and 220 store indications of a scheduled departure and a scheduled arrival, respectively. The field 225 stores an indication of an intermediate locale along a valid path, whereas the field 230 stores an indication of an acceptable duration of stay at the intermediate locale. The fields 235 and 240 store indications of another intermediate locale and a corresponding permissible duration of stay.

The duration of stay stored in entries of the table 250 may be absolute time durations or historical average time durations. Weighted average time durations may also be used. Various other categories of time durations are possible and contemplated. The durations of stay stored in the table 250 may be updated by the update logic 280 after tracking information is received. The formulas used to determine the durations of stay to store in the table 250 may be programmed by an administrator in the tracking service. Alternatively, a default programming may be used to remove burden from the administrator.

The table 250 may include additional fields which are not shown for ease of illustration. For example, the additional fields may store indications of more intermediate locales and corresponding durations of stay. The additional fields may also store indications of permissible paths. The additional fields may further store metadata, such as an indication of a valid entry, and a type of alert to send when violations are found. Various other examples of information to store in the entries are possible and contemplated. The entry identified by indexing into the table 250 has its corresponding information read out and provided to the control logic 270.

The control logic 270 uses at least the information provided by the indexed entry in table 250. Additionally, the control logic 270 may use other information such parameters 265. Parameters 265 may include a timestamp indicating the time of day, the day of the week and the month of the year. In some embodiments, multiple entries are allocated in the table 250 for a same point of origin and destination to store information for different windows of time. In other embodiments, a single entry in the table 250 for a particular combination of a point of origin and a destination is updated by the update logic 280 based on the timestamp. For example, a duration of stay at a sporting goods store between school and home may increase when a given sports season is occurring. Additionally, the update logic 280 may update values stored in the table 250 as historical information is received from updated crowdsourced information. Therefore, received historical information may be used to determine and update an expected duration of stay. An administrator may override the duration of stay and remove automatic updates by the update logic 280 based on one or more of received historical crowdsourced information and historical personal behavior information. Alternatively, the administrator may set the duration of stay, but allow automatic updates by the update logic 280 based on one or more of received historical crowdsourced information and historical personal behavior information.

In some embodiments, the parameters 265 includes a limit for a number of paths, a limit for a number of intermediate locales along a path and priorities to use for ranking paths and intermediate locales along paths. The parameters 165 may include the factors described earlier. For example, the parameters 265 may indicate ranking factors such as the shortest paths using distance, the longest paths using distance, the paths with an estimated shortest travel time, and paths with a least number of turns, paths with the cheapest cost of travel, paths with a least amount altitude climb and so on. The parameters 265 may include user configurable factors indicating desirable path types, such as an exercise path, a time efficient path, a path with particular stores (music stores) and so on.

The parameters 265 may include indications of undesirable intermediate locales. Alternatively, the table 250 may include an indication of the undesirable intermediate locales and an associated 0 minutes for the corresponding duration of stay. The parameters 265 may include weight values based on received information indicating how crowded is a given intermediate locale. For example, a beacon at a coffee shop, a convenience store, a retail store or other may broadcast this information, which is received by the trackable device. The trackable device sends this information across a network to the server executing the tracking service. The tracking service may use this information as parameters 265 and adjust a given duration of stay based on the received information. The control logic 270 may decrease the given duration of stay from the table 250, such as for a coffee shop, a comic book store or other, when the received information now used in parameters 265 indicates the intermediate locale is relatively empty. Alternatively, the control logic 270 may increase the given duration of stay from the table 250 when the intermediate locale is relatively crowded. For example, the information received from a beacon or other means may indicate the intermediate locale currently has an occupancy above a threshold.

Although a single table is shown for table 250, in other embodiments, multiple tables may be used. A first table may be indexed by the received tracking information 260, and a second table may be indexed by information retrieved from a given entry in the first table. A third table and so on may also be used and indexed in this manner. Additionally, the received tracking information 260 may include an indication of the trackable entity and this information is used to select a given table of multiple tables. For example, a same trackable device, such as a smartwatch, a pocket-sized GPS trackable device, a tablet computer, an automobile global positioning system (GPS) device attached to a vehicle shared by multiple drivers, and so on, may be shared by multiple users. An indication of the user may be provided as identification of the trackable entity during the setup of the tracking service. Therefore, multiple tables may be created and a given table is selected based on the identification of the trackable entity.

The control logic 270 uses at least the information provided by the indexed entry in table 250 and the parameters 265. The control logic 270 may calculate a duration of stay at a current intermediate locale when it is detected the trackable entity has made a stop at the intermediate locale based on received location-aware information from the trackable device. At least an indication of time corresponding to the trackable device entering the intermediate locale and a current indication of time corresponding to the trackable device still remains at the intermediate locale are used for the calculation.

The control logic 270 may compare the calculated duration of stay with the duration of stay read out from the table 250. Adjustments may be made based on any received occupancy information and other factors, such as weather (rain, snow). The control logic 270 may determine whether the trackable entity has remained at the intermediate locale for at time exceeding the expected duration of stay. The comparison may be programmable logic. Following, the control logic 270 generates a response indicating whether to generate an alert. For example, the control logic can send a text message to a smartphone or a smartwatch. The control logic can also send an email and a push notification. As described earlier, in some embodiments, each of the control logic 270 and the update logic 280 is programmed by the administrator in the tracking service. In other embodiments, each of the control logic 270 and the update logic 280 has default programming in the tracking service to remove as much burden as possible from the administrator.

Referring to FIG. 3, a generalized block diagram of one embodiment of tracking movement of a vehicle as a trackable entity between a point of origin and a destination is shown. Control logic and components described earlier are numbered identically. In the embodiment shown, the trackable entity 320 is a delivery truck with an attached trackable device. As described earlier, an administrator (not shown) sets up an account with the tracking service 185 and identifies the trackable entity 320, a point of origin 305 and a destination 310. To identify the trackable entity 120, the administrator may provide identification of the trackable device and possibly the driver. The identification of the trackable device may include a device identifier (ID). It may be assumed the movement of the trackable device correlates with the movement of the trackable entity.

In various embodiments, the point of origin 305 is a warehouse, the destination 310 is a store or delivery depot and the administrator is a company supervisor. The administrator accesses the tracking service 185 through a mobile application or an internet web browser application running on a local computing device. Once an account is setup, the administrator can login to the server 180, which executes the tracking service 185, and provide the identification of the trackable entity 320, the point of origin 305 and the destination 310.

In various embodiments, upon identifying the trackable entity 320, the point of origin 305 and the destination 310, the administrator provides no further information to set up a tracking policy for monitoring the movement of the trackable entity 320. The tracking policy enforced by the tracking service 185 may be used to provide security and identify expected arrival and departure times. The administrator may provide no further information to set up the tracking policy despite a relatively large number of possible combinations of paths and stops (or intermediate locales) along the paths between the point of origin 305 and the destination 310. In the embodiment shown, four paths 330A-330D are identified between the point of origin 305 and the destination 310. However, any number of paths may exist and be identified between the point of origin 305 and the destination 310.

In place of the administrator entering further information than the above identification, the tracking service 185 may access crowdsourced information 390 stored in a database to identify paths 330A-330D between the point of origin 305 and the destination 310. The administrator may not identify any paths let alone paths 330A-330D. The crowdsourced information 390 stores history information about the movement of trackable entities between the point of origin 305 and the destination 310. The crowdsourced information 390 may have been obtained from multiple sources as described earlier. The tracking service 185 may rank multiple identified paths and select a subset of paths, such as paths 330A-330D, from the multiple paths for later verifying the movement of the trackable entity 320. The ranking and selecting may be done based on a variety of factor as described earlier.

The tracking service 185 identifies intermediate locales (stops) along the paths 330A-33D based on the history of movements. As shown, the tracking service 185 identified the intermediate locale 335A along path 330A. The intermediate locale 335A may be a restaurant, diner, truck stop, weighing station and so on. In addition, the tracking service 185 identified intermediate locale 335B along path 330B which is a gas station. The tracking service 185 determines an expected duration of stay for each of the intermediate locales 335A-335B based on the history of movements found in the durations of stay 395 in the crowdsourced information 390. When the server 180 receives information from the trackable device, the tracking service 185 can determine whether any violations occurred during monitoring of the movements of the trackable entity 320. If so, the tracking service 185 can generate alerts. The tracking service 185 can send the alert to one or more devices accessible by the administrator.

Turning now to FIG. 4, a generalized block diagram of another embodiment of logic used for determining whether violations occur during movement of a trackable entity is shown. The logic may be used by a tracking service for monitoring the movement of a delivery truck. Similar to the logic used for monitoring the trackable movement of a person, the received tracking information 460 is used to index the table 450, and the information read out from a selected table entry is used by the control logic 470 in addition to the parameters 465. One or more of the 405-440 fields stored in the table 450 may be updated by the update logic 480.

The control logic 470 may compare a calculated duration of stay with the duration of stay read out from the table 450. Adjustments may be made based on any received occupancy information and other factors, such as weather and traffic reports. The control logic 470 may determine whether the trackable entity has remained at the intermediate locale for at time exceeding the expected duration of stay. The control logic 470 generates a response indicating whether to generate an alert to an administrator such as a company supervisor.

Turning now to FIG. 5, one embodiment of a method 500 for using a history of movements of trackable entities to setup and use a tracking service is shown. For purposes of discussion, the steps in this embodiment (and embodiments for FIG. 6 and FIG. 7) are shown in sequential order. However, some steps may occur in a different order than shown, some steps may be performed concurrently, some steps may be combined with other steps, and some steps may be absent in another embodiment.

A tracking service receives identification of a trackable entity (block 502). An administrator may provide the identification during set up of a tracking policy for the trackable entity. The trackable entity may be a person of interest, a vehicle carrying goods of interest, one or more animals of interest and so forth. The tracking service also receives identification of a point of origin (block 504) and receives identification of a destination (block 506). In various embodiments, the administrator provides no further information to setup a tracking policy to provide security and identify expected arrival and departure times and durations of stay at intermediate locales along paths despite a relatively large number of possible combinations of paths and intermediate locales.

The tracking service identifies paths between the point of origin and the destination based on a history of movements of trackable entities between the point of origin and the destination (block 508). As described earlier, the tracking service can access crowdsourced information to rank and select paths, rank and select intermediate locales along the selected paths and determine durations of stay for the selected intermediate locales. As the tracking service receives location-aware information from the trackable device, the tracking service tracks the movement of the trackable entity (block 510). The tracking service may update expected durations of stay for the selected intermediate locales based on a history obtained from the crowdsourced information, a history based on the location-aware information from the trackable device, and other factors such as weather, traffic reports, occupancy of the intermediate locales, provided interest or hobby changes, timestamp information and so on.

If the tracked movement of the trackable entity does not vary from the selected paths ("no" branch of the conditional block 512), then the tracking service continues to monitor the movement of the trackable entity and control flow of method 500 returns to block 510. However, if an anomaly in the movement of the trackable device is detected (e.g., the tracked movement of the trackable entity varies from the selected paths) ("yes" branch of the conditional block 512), then the tracking service generates an alert (block 514).

The tracking service may determine the tracked movement varies from the selected paths based on multiple conditions. For example, the trackable entity may traverse a path which is not one of the selected paths. The trackable entity may stop at an intermediate locale which is not one of the selected intermediate locales. The trackable entity may also stop and remain at a permissible intermediate locale for a time exceeding an expected duration of stay. Each of the above examples is an anomaly from expected movement of the trackable entity. When the tracking service determines one of the above violations has occurred, the tracking service generates the alert and sends the alert to one or more devices accessible by the administrator. The tracking service can send a text message to a smartphone or a smartwatch and can send an email and a push notification.

Turning now to FIG. 6, one embodiment of a method 600 for generating alerts responsive to determining violations have occurred during the tracking of movements of a trackable entity is shown. When a tracking policy for a trackable entity is set up, a tracking service begins determining whether movement of the trackable entity varies from identified paths (block 602) The tracking service receives geographical location information for the trackable entity (block 604). If a path being traversed by the trackable entity is not an allowed path ("no" branch of the conditional block 606), then the tracking service generates an alert (block 620). As described earlier, the tracking service can generate an alert and send one or more of a text message, an email and a push notification to a computing device accessible by the administrator.

If a path being traversed by the trackable entity is an allowed path ("yes" branch of the conditional block 606), but a trip time limit is exceeded ("yes" branch of the conditional block 608), then the tracking service generates an alert. Otherwise, it is determined whether an intermediate locale is being visited. If so ("yes" branch of the conditional block 610) and the intermediate locale is not permitted ("no" branch of the conditional block 612), then the tracking service generates an alert (block 620). Otherwise, if an intermediate locale is being visited ("yes" branch of the conditional block 610) and the intermediate locale is permitted ("yes" branch of the conditional block 612), then it is determined whether the trackable entity has stayed at the intermediate locale for a time exceeding an expected duration of stay. If so ("yes" branch of the conditional block 614), then the tracking service generates an alert (block 620). If no violations are not yet found, then the tracking service continues to monitor the movement of the trackable entity by waiting for more location-aware information and control flow of method 600 returns to block 604.

Turning now to FIG. 7, one embodiment of a method 700 for setting up the tracking of the movements of a trackable entity is shown. Tracking of a trackable entity is set up (block 702). The setup of the tracking may include identification of the trackable entity, a point of origin and a destination. In some embodiments, a tracking service accesses one or more databases for additional information to use for setting up tracking of the trackable entity. If additional parameters are being used to characterize the tracking ("yes" branch of the conditional block 704), then the additional parameters are accessed and received (block 706). For example, the additional parameters may include interests and hobbies of a given user, weather, highway tolls, and elevation along routes, sources of water in streams or creeks for cattle or horses, and so forth. The parameters may depend on the trackable entity and the types of routes used for paths between the point of origin and the destination.

In some cases, tracking the trackable entity has already been done for at least one point of origin and one destination. Therefore the setup of tracking performed in block 702 is for an additional point of origin, an additional destination or a different (or additional) pair of point of origin and destination. In such cases, a user history may have been maintained for the trackable entity. The user history may have been created by use of the same trackable device or by use of another trackable device. For example, a driver sharing a vehicle with an automobile global positioning system (GPS) device among multiple drivers may already have a user history created by tracking with a different trackable device. The other different trackable device may include a smartphone, a smartwatch, another vehicle with an automobile global positioning system (GPS) device, and so forth.

If no additional parameters are being used or each of the additional parameters are received ("no" branch of the conditional block 704) and a personal user history is being accessed ("yes" branch of the conditional block 708), then an identification of a user for the trackable entity is received (block 710). For example, multiple drivers may use a given vehicle. An automobile global positioning system (GPS) device may be attached to a vehicle shared by multiple drivers. Similarly, multiple users may share a tablet computer, a smartwatch and so on. Identification of the user may be received to distinguish between the multiple users. Paths between the point of origin and the destination are identified based on the personal user history of the identified user and any additional parameters (block 712). In some embodiments, one or more additional parameters may be added, removed or updated based on the identification of the user. For example, the demographics of the user may eliminate or qualify one or more parameters.

If a personal user history is not being accessed ("no" branch of the conditional block 708), then paths between the point of origin and the destination are identified based on crowdsourced history and any additional parameters (block 714). In some embodiments, a combination of the personal user history and the crowdsourced history is used to identify paths. A number N paths are selected from the identified paths (block 716). The limit N is a positive non-zero integer and it may be set by a default value or set as a configurable value.

Intermediate locales are identified along the selected N paths (block 718). One or more of the crowdsourced information and the personal user history can be used to identify the intermediate locales. Durations of stay are determined at the identified locales based on one or more of the crowdsourced history and the personal user history (block 720). The movement of the trackable entity is tracked (block 722). For example, the trackable device sends location-aware information to the tracking service, which determines whether the trackable entity violates any conditions of the set up tracking policy. In addition, feedback is provided for maintaining history information (block 724). The paths traversed, the intermediate locales visited and the durations of stay found by tracking the trackable entity may be used to update one or more of the crowdsourced history information and the personal user history information. Therefore, the conditions which may be violated are also updated and the results of determining whether the conditions are violated may vary over time for a same trackable entity.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be to provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a trackable entity comprising a trackable mobile device carried by a person of interest, said device being trackable by a global positioning system; and
a server configured to:
receive, from a computing device, an identification of the trackable entity;
receive, from the computing device, an identification of each of a point of origin and a destination without receiving an identification of a path between the point of origin and destination;
access a database to identify, prior to movement of the trackable entity, one or more paths between the point of origin and the destination based on a history of movements of trackable entities comprising mobile devices carried by persons walking between the point of origin and the destination, wherein the trackable entities do not include the trackable entity;
receive global positioning system related data indicative of movement of the trackable entity; and
generate an alert responsive to determining a movement of the trackable entity varies from the one or more paths;
wherein the server is further configured to:
identify one or more intermediate locales along the identified one or more paths;
determine an expected duration of stay for each of the one or more intermediate locales based on the history of movements; and
adjust an expected duration of stay for an intermediate locale based on one or more of an occupancy of the intermediate locale, weather, and traffic reports.

2. The system as recited in claim 1 wherein determining a movement of the trackable entity varies from the one or more paths comprises determining the trackable entity has been at an identified intermediate locale for a time exceeding an expected duration of stay.

3. The system as recited in claim 1, wherein the server is further configured to identify the one or more paths and the expected durations of stay based on additional parameters comprising one or more of a particular time of day, a particular day of the week and a particular month.

4. The system as recited in claim 1, wherein the server is further configured to identify the one or more paths based on additional parameters comprising interests and hobbies of the trackable entity.

5. The system as recited in claim 1, wherein determining a movement of the trackable entity varies from the one or more paths comprises determining the trackable entity no longer sends geographical location information for tracking movement of the trackable entity.

6. The system as recited in claim 1, wherein the server is further configured to:
map the identified one or more paths to routes from a routes database; and
send the generated alert to a destination device comprising one or more of a mobile device and a computer.

7. The system as recited in claim 1, wherein the history of movements is based on crowdsourced information.

8. A method comprising:
receiving, from a computing device, an identification of a trackable entity comprising a trackable mobile device carried by a person of interest, said device being trackable by a global positioning system;
receiving, from the computing device, an identification of each of a point of origin and a destination without receiving an identification of a path between the point of origin and destination;
accessing a database to identify, prior to movement of the trackable entity, one or more paths between the point of origin and the destination based on a history of movements of trackable entities comprising mobile devices carried by persons walking between the point of origin and the destination, wherein the trackable entities do not include the trackable entity;
receive global positioning system related data indicative of movement of the trackable entity;
generating an alert responsive to determining a movement of the trackable entity varies from the one or more paths;
identifying one or more intermediate locales along the identified one or more paths;
determining an expected duration of stay for each of the one or more intermediate locales based on the history of movements; and
adjusting an expected duration of stay for an intermediate locale based on one or more of an occupancy of the intermediate locale, weather, and traffic reports.

9. The method as recited in claim 8, wherein determining a movement of the trackable entity varies from the one or more paths comprises determining the trackable entity has been at an identified intermediate locale for a time exceeding an expected duration of stay.

10. The method as recited in claim 8, further comprising identifying the one or more paths and the expected durations of stay based on additional parameters comprising one or more of a particular time of day, a particular day of the week and a particular month.

11. The method as recited in claim 8, further comprising identifying the one or more paths based on additional parameters comprising interests and hobbies of the trackable entity.

12. The method as recited in claim 8, further comprising:
mapping the identified one or more paths to routes from a routes database; and
sending the generated alert to a destination device comprising one or more of a mobile device and a computer.

13. A non-transitory computer readable storage medium comprising program instructions, wherein the program instructions are executable by a processor to:
receive, from a computing device, an identification of a trackable entity comprising a trackable mobile device carried by a person of interest, said device being trackable by a global positioning system;
receive, from the computing device, an identification of each of a point of origin and a destination without receiving an identification of a path between the point of origin and destination;
access a database to identify, prior to movement of the trackable entity, one or more paths between the point of origin and the destination based on a history of movements of trackable entities comprising mobile devices carried by persons walking between the point of origin and the destination, wherein the trackable entities do not include the trackable entity;
receive global positioning system related data indicative of movement of the trackable entity;
generate an alert responsive to determining a movement of the trackable entity varies from the one or more paths;

identify one or more intermediate locales along the identified one or more paths;
determine an expected duration of stay for each of the one or more intermediate locales based on the history of movements; and
adjust an expected duration of stay for an intermediate locale based on one or more of an occupancy of the intermediate locale, weather, and traffic reports.

14. The non-transitory computer readable storage medium as recited in claim 13, wherein determining a movement of the trackable entity varies from the one or more paths comprises determining the trackable entity has been at an identified intermediate locale for a time exceeding an expected duration of stay.

15. The non-transitory computer readable storage medium as recited in claim 13, wherein the history of movements is based on crowdsourced information.

\* \* \* \* \*